United States Patent [19]

Steger

[11] Patent Number: 5,385,667
[45] Date of Patent: Jan. 31, 1995

[54] APPARATUS FOR THE PURIFICATION OF SHOWER WATER

[76] Inventor: William R. Steger, 7145 Logan Ave. S., Minneapolis, Minn. 55423

[21] Appl. No.: 51,003

[22] Filed: Apr. 21, 1993

Related U.S. Application Data

[63] Continuation of Ser. No. 710,117, Jun. 4, 1991, abandoned.

[51] Int. Cl.6 .................................................. B01D 15/00
[52] U.S. Cl. .................................. 210/198.1; 210/446; 210/449; 210/460; 210/503; 210/266; 4/615
[58] Field of Search ............... 210/198.1, 266, 282, 210/446, 449, 459, 460, 500.25, 503, 505, 508, 263, 500.1, 696, 757, 764, 687; 4/596, 597, 615

[56] References Cited

U.S. PATENT DOCUMENTS

| | | | |
|---|---|---|---|
| 1,045,057 | 11/1912 | Moran et al. | 422/266 |
| 1,162,455 | 11/1915 | Collins | 210/282 |
| 1,774,004 | 8/1930 | Haslett | 210/282 |
| 2,216,844 | 10/1940 | Kuhl | 210/716 |
| 3,204,770 | 9/1965 | Brink | 210/282 |
| 4,242,201 | 12/1980 | Stephens et al. | 210/282 |
| 4,332,685 | 6/1982 | Newlin et al. | 210/266 |
| 4,416,854 | 11/1983 | Nielsen | 422/266 |
| 4,430,226 | 2/1984 | Hegde et al. | 210/282 |
| 4,642,192 | 2/1987 | Heskett | 210/638 |
| 4,933,080 | 6/1990 | Rundzaitis et al. | 210/232 |
| 5,008,011 | 4/1991 | Underwood | 210/282 |
| 5,013,450 | 5/1991 | Gomez | 210/687 |

OTHER PUBLICATIONS

Perry's Chemical Engineers Handbook (1984) pp. 5–6.

*Primary Examiner*—Peter Hruskoci
*Assistant Examiner*—Robert James Popovics

[57] ABSTRACT

An apparatus for the purification of shower water by the intimate contact with finely divided metal comprising copper and zinc. This apparatus causes turbulence of the water in contact with the metal. Also a method for the purification of water by the intimate contacting of shower water in a turbulent state with finely divided metal comprising copper and zinc. A showerhead can be directly connected to the outlet supplying purified water.

8 Claims, 2 Drawing Sheets

APPARATUS FOR THE PURIFICATION OF SHOWER WATER

This application is a continuation of application Ser. No. 710,711, filed Jun. 4, 1991, now abandoned.

BACKGROUND

The present invention relates to the purification of shower water. In particular the present invention is to an apparatus and method for efficiently removing chlorine and other impurities from water used for showers. An important aspect of the present invention is an apparatus and method for the removal of the impurities, such as chlorine, hydrogen sulfide, metals, etc. found in water used as shower water.

Apparatus and methods for the purification of water have been disclosed in the literature. The softening of water has often been the subject of disclosures on the purification of water.

Kühl U.S. Pat. No. 2,216,844 discloses the use of metals which are not added to the water being treated but are added to the solution of the softening agents before their introduction into the water to be treated. According to Kühl this is an improvement on the addition of metal salts as softening agents.

Brink U.S. Pat. No. 3,204,770 discloses a compact portable water softener using a zeolite. The apparatus prevents channeling of the water and provides good contact of the flowing water with a zeolite in a container.

Stephens et al U.S. Pat. No. 4,242,201 discloses a by-pass water softening system which can be used in shower installations. The water softener is a change of ion exchange resin in an elongated tank.

Newlin et al U.S. Pat. No. 4,332,685 discloses softening water by passing the water through an ion exchanger and then passing part of the softened water through a reverse osmosis apparatus.

Hegde et al U.S. Pat. No. 4,430,226 discloses a cartridge and method for producing ultrapure water by passing the water through an admixture of particles of mixed ion exchange resins and activated carbon low in ash content and preferably low in fines.

Also the literature contains disclosures of apparatus and method for removing other impurities from water.

Kim U.S. Pat. No. 4,455,236 discloses passing waste water through a redox resin to remove hydrogen sulfide.

Nielson U.S. Pat. No. 4,416,854 discloses a method and apparatus to kill microorganisms in bodies of water such as swimming pools. The disclosed apparatus is a perforated container suspendable in a body of water.

Heskett U.S. Pat. No. 4,642,192 discloses removing undesirable constituents such as chlorine and nitrates from fluids by passing the fluid containing the undesirable constituents through a bed of metal particulate matter.

Then too filters useful in the removal of particles from water are well known in the art.

Collins U.S. Pat. No. 1,162,455 discloses an automatically operating self-cleaning purifier or filter which permits the removal of filth, mud and other impurities from water or other liquids.

Regardless of the disclosures in the literature for the purification of water there is a need for an efficient system for the purification of water for use in showers.

Accordingly, an object of the present invention is an efficient method for the removal of contaminants in shower water.

Another object of the present invention is a system for providing purified water to a showerhead.

Another object of the present invention is an apparatus for purifying water used in shower.

Still another object of the present invention is an apparatus that can be effectively used to supply purified shower water directly to the showerhead without the need for additional equipment.

Also an object of the present invention is an apparatus that can be used continuously for extended periods of time to remove contaminants from shower water without the need to continually clean or replace its components.

Still another object of the present invention is a shower system, directly fed with purified water.

Other objects of the present invention will become apparent from the ensuing description.

SUMMARY OF THE INVENTION

A method for the efficient removal of contaminants from shower water by circulating said water under turbulent conditions in intimate contact with finely divided metal comprising copper and zinc in a chamber having water inlet and water outlet passages and means for separating the finely divided metal from the outlet water. Also an apparatus for effectively removing materials that may be present in shower water such as chlorine, hydrogen sulfide, metal, etc. The present apparatus contains means for contacting said water under turbulent conditions with the finely divided metal and separating the finely divided metal from the outlet water. In a preferred embodiment, the purified outlet water from the present apparatus can be directly supplied to a showerhead without the need for storage or the need for other equipment between the apparatus and the showerhead. This apparatus can find utility in uses where intimate contact of a fluid and metal particulates can be of value.

DETAILED DESCRIPTION OF THE INVENTION

Figure 1:
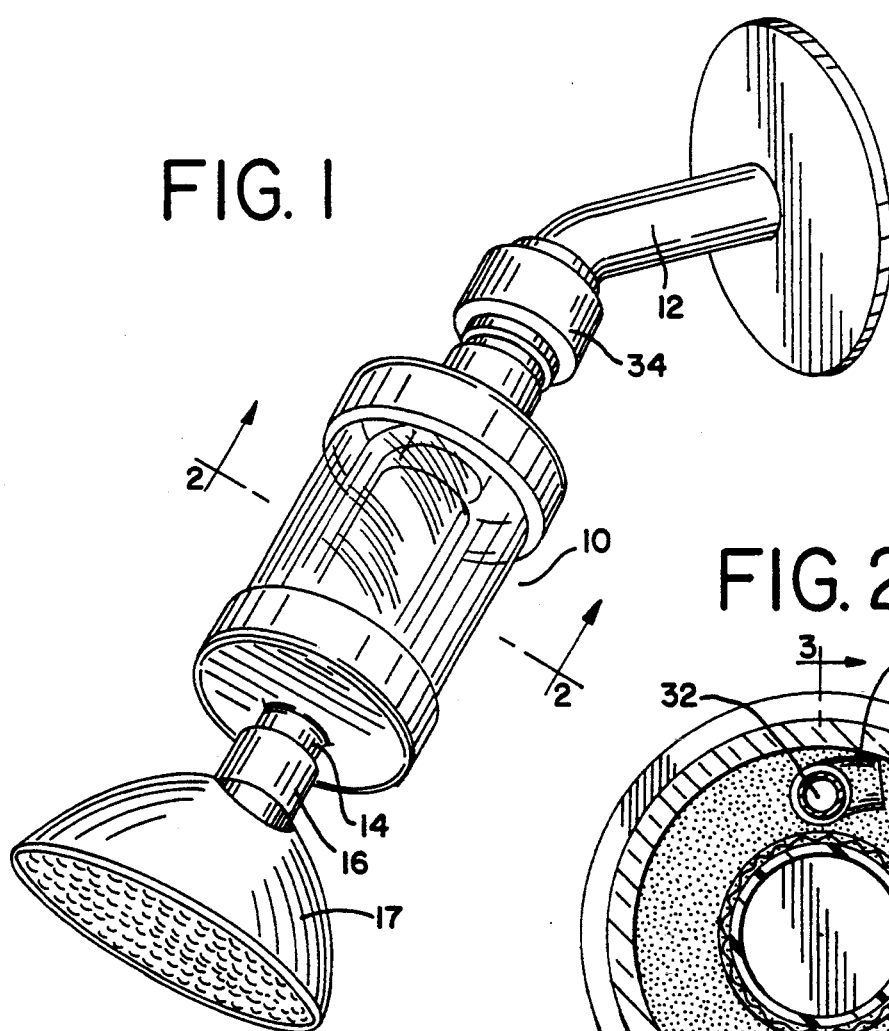
FIG. 1 is a perspective of the apparatus of the present invention connected to a plumbing pipe and a showerhead.

Referring to the drawings, there is illustrated in FIG. 1 a perspective of the apparatus of the present invention 10 attached to a plumbing pipe 12, a water outlet pipe 14 and a showerhead 17. Household water flows through the plumbing pipe 12 into the apparatus of the present invention 10. Then the purified water will flow from the present apparatus 10 through water outlet pipe 14 and into showerhead 17 for normal use. A check valve 34 is often present in the plumbing pipe 12 in order to prevent the finely divided metal present in the chamber 28 of the apparatus 10 from entering the plumbing system which can occur when the water impact is stopped or substantially slowed, causing the pressure in the inlet line to be reduced. This shower water will have its content of chlorine, hydrogen sulfide, bacteria, heavy metals and other contaminants substantially removed in the present apparatus.

The shower system depicted in FIG. 1 is of particular value. As will be explained subsequently, the present apparatus efficiently removes from the water sent to the showerhead, contaminants which can be detrimental to the skin and other parts of the body and water piping. This is readily accomplished by the present apparatus which due to its convenient size made possible by its effectiveness in performance can be in the plumbing line immediately preceding the showerhead. Naturally if it is desired, the outlet line from the present apparatus to the showerhead can be sized and shaped to meet the requirements of the house.

Also the present apparatus for the purification of shower water has the unique advantage of eliminating any need to have in the line pressure equalizing equipment. The pressure at the water outlet 14 will be approximately the same as the pressure at the showerhead inlet 16, thus eliminating bulky and costly equipment that can be necessary when using reverse osmosis or other technology for the purification of the shower water. This direct connection of the water purification apparatus 10 to the showerhead 17 caused by the reasonably small size of the purification apparatus and its high efficiency in purifying water is a unique advantage of the present shower system. Furthermore, the water purified by the present apparatus having had the chlorine, hydrogen sulfide and metals removed therefrom will be significantly less likely to cause corrosion and otherwise adversely affect the plumbing pipes carrying it.

Figure 2:
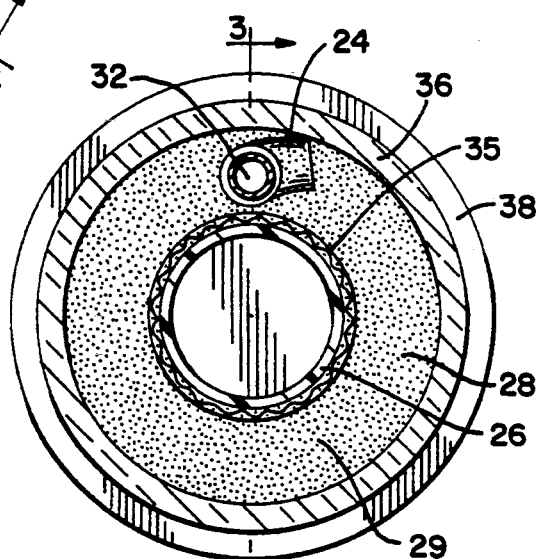
FIG. 2 is a transverse section taken substantially along line 2—2 of FIG. 1.
Figure 3:
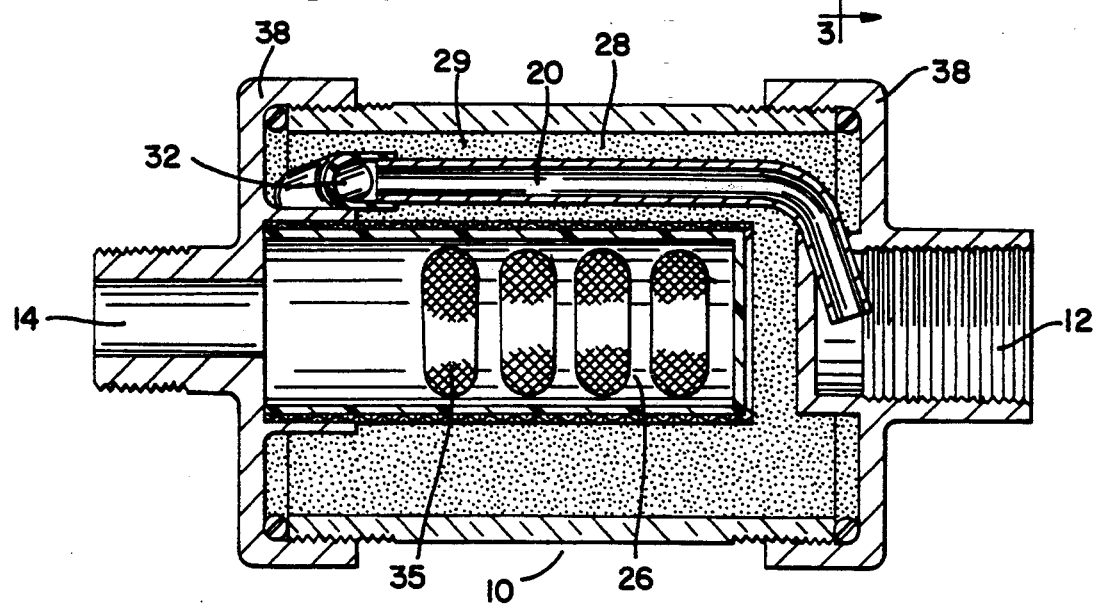
FIG. 3 is a longitudinal section taken substantially alone line 3—3 of FIG. 2.

Referring now to FIGS. 2 and 3, one embodiment of the present apparatus can be readily described.

In the operation of this embodiment of the present household water enters the present apparatus 10 from plumbing pipe 12 by means of water inlet tubes 20 into the lower portion of chamber 28 containing finely divided metal 29 comprising copper and zinc particles. The combination of copper and zinc can be an alloy. The temperature of the water will depend upon the ultimate use of the water purified by the present apparatus. Higher temperature water may be purified by the present apparatus more efficiently than lower temperature water although lower temperature water can be effectively purified by the present apparatus.

The water flowing from outlet 32 passes through the finely divided metal 29 in the lower portion of chamber 28. This water flow causes the finely divided material 29 to be in intimate contact with the water in the chamber 28. Chamber 28 in this embodiment of the present invention is maintained in position by housing 38 which has attached on its ends inlet plumbing pipe 12 and outlet plumbing pipe 14. Depending upon the rate of flow of the water, turbulence is formed in the chamber resulting in effective contacting of the water with the finely divided metal. The water can readily enter the chamber containing the metal particles at a rate that will cause an amount of turbulence in the chamber 28 sufficient to effect substantially total removal of the chlorine, hydrogen sulfide, metal and bacteria that may be present in the inlet water.

The finely divided metal useful in the present apparatus is a mixture of metals having redox potentials such as to cause the desired oxidation and reduction reactions between the contaminants in the water and the finely divided metals. It is preferred to use finely divided metals comprising copper and zinc. Generally it is desirable to use an alloy having a weight ratio of copper to zinc from about 1:1 to about 7:3, although higher and lower weight ratios can be used effectively.

Turbulent flow of the water in the chamber 28 causes intimate contacting with the finely divided material comprising copper and zinc. The present apparatus causes an unusually high amount of turbulence. A factor is the positioning and shape of the water inlet tube 20 and its outlet 32 into the chamber 28.

Figure 4:
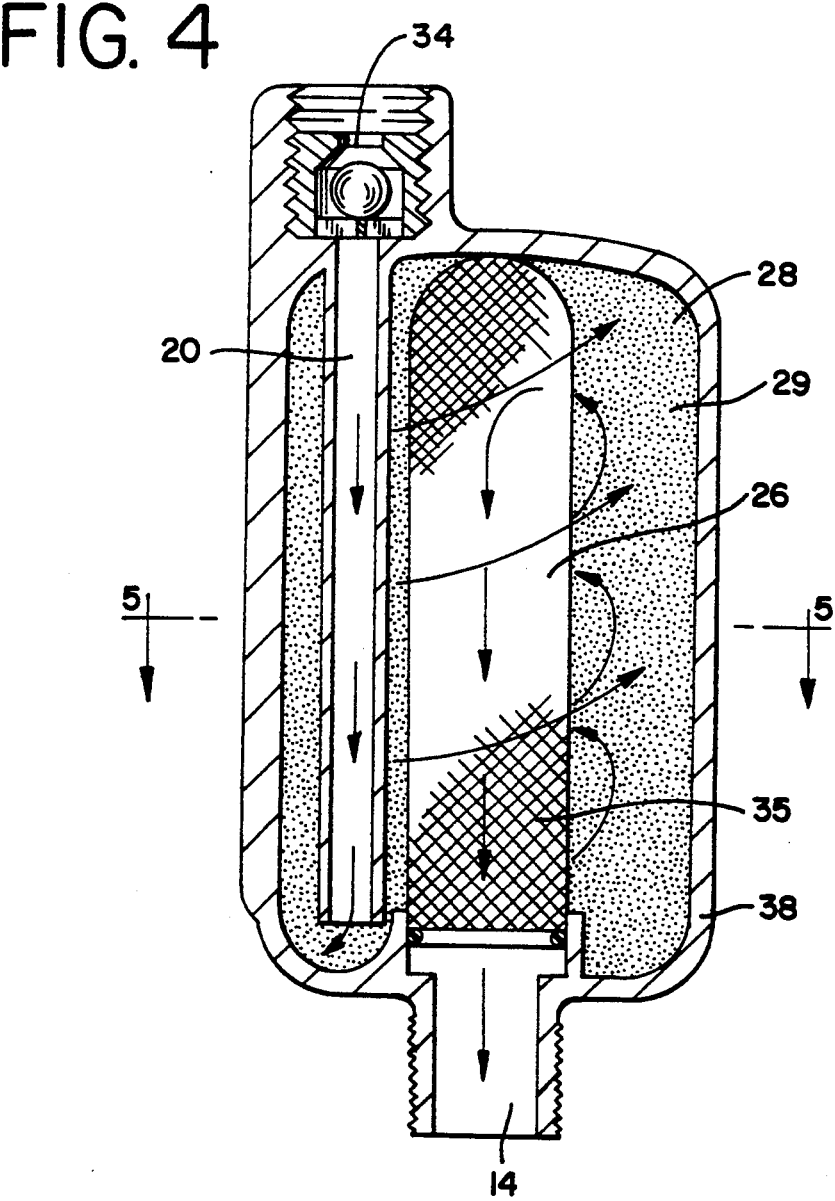
FIG. 4 is a longitudinal section taken substantially along line 3—3 of FIG. 2 showing an alternative embodiment.
Figure 5:
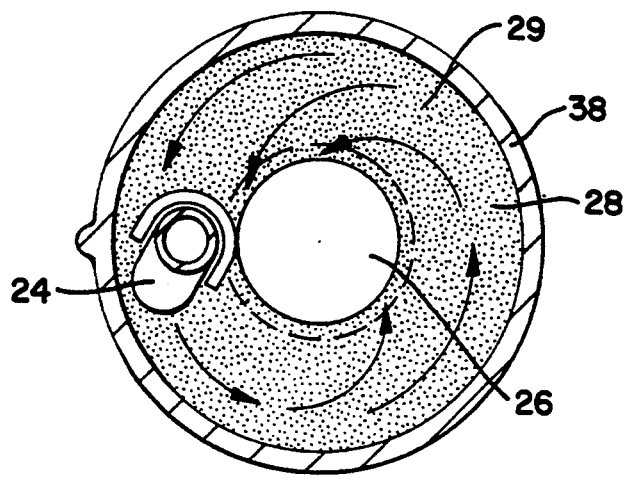
FIG. 5 is a transverse section taken substantially along line 5—5 of FIG. 4.

As can be seen in FIG. 2, one embodiment that will cause additional turbulence and intimate contacting of the finely divided particles with the water and removal of the contaminants is the presence of the water inlet pipe's opening 32 is an elbow 24 or other directional piece of pipe that will direct the flow of inlet water towards the wall of the chamber 28. This flow as shown in FIGS. 4 and 5 is such that the water will special around in the chamber 28 until it leaves by means of outlet water pipe 26 and through screen 35. Thus the water is in contact with the finely divided particles 29 for sufficient intimate contact with the water. For this reason, as previously indicated, the size of chamber 28 can be minimized. Chambers having an internal radius of 3 to 5 inches and a length of 5 to 8 inches meet most needs, although smaller or larger size chambers can be used.

Referring to FIGS. 4 and 5, the water circulation in the present apparatus can be seen. Water from the plumbing pipe 12 enters the water inlet tube 20. Check valve 34 consists of a ball 40, spring 42 and disc 44 opens to allow entry of the inlet flow of water and closes when the water flow is turned off to prevent the finely divided material from flowing back into the plumbing pipe.

The inlet water as shown in the embodiment of the present invention as shown in FIGS. 4 and 5 can be directed by the horseshoe type piece 24 against the wall of the chamber 28 with sufficient force to cause the water to flow with turbulence in the direction depicted by the arrows. During this flow through the chamber 28 the water is in intimate contact with the finely divided material particles 29. Then the purified water passes out of the chamber 28 by flowing through screen 35 into outlet water pipe 26. This water can then flow into a showerhead as shown in FIG. 1 or be used for other purposes.

It is desired to keep the finely divided metal 29 from leaving the chamber 28 with the purified water. In this embodiment a screen having openings sufficiently smaller than the size of the metal particles was used to keep the metal particles in the chamber. By finely divided it is meant particles that are of a mesh sufficient to permit the particles to be dispersed in the turbulent water. For example, it has been found that metal particles having a mesh size of from about 50 to 400 can be used, although this invention is not limited to their use. A screen of 500 mesh will retain this size metal particles in the chamber. Other sizes and other methods of preventing the metal particles from leaving the chamber 29 with the purified water can be used for this function.

An effective amount of the metal particles are present in the chamber 29 of the apparatus. The quantity of the metal particles that can be present in the chamber and in contact with the water can vary significantly provided there is an effective amount and sufficient open space in the chamber for the turbulence of the water in contact with the metal particles. Thus in most instances a small amount of the metal particles will be effective.

Other embodiments can be used within the scope of the present invention. Various means for forcing the water out of the inlet water tube 20 can be used. Although it is desired to have a smaller diameter inlet 32 than the diameter of the inlet tube 20 which can be achieved by various procedures such as having the inlet tube crimped near its open end 32 and faced in close proximity to the wall of chamber 28. By this design a spray of water enters the chamber 28 and the water turbulence is created sufficient to cause intimate contact with the finely divided metal 29.

Other designs that allow for the water from the water inlet tube to form turbulent flow in the chamber 29 are also within the scope of the present invention.

In experimental use the present apparatus has been effective in purifying more than 26,000 gallons of water containing 2 parts per million of chlorine. After 13,000 gallons of water had been passed through the finely divided copper and zinc particles as previously described, the chlorine content of the outlet water was about 0.0167 parts per millions; after 20,000 gallons of water had been passed through the apparatus, the chlorine contact of the outlet water was about 0.0835 parts per million; and after 26,000 gallons of water were passed through the apparatus, the chlorine content of the outlet water was 0.167 parts per million. This data demonstrates the effectiveness of the present apparatus.

It should be understood that the embodiments of the present invention which have been described are merely illustrative of a few of the applications of the principles of the present invention. Numerous modifications may be made by those skilled in the art without departing from the true spirit and scope of the invention.

I claim:

1. An apparatus for the purification of household water which comprises:

a chamber having water inlet and outlet passages, containing an effective amount of finely divided metal particles having a suitable redox potential and having sufficient unfilled space for the suspension of the finely divided metal particles in the household water flowing therethrough;

water inlet means for directing the flow of household water from said water inlet passage into and radially outwardly through the finely divided metal particles in the chamber and for suspending the finely divided metal particles in said chamber said inlet means including a water inlet tube extending into said finely divided metal particles, wherein said water inlet tube has a smaller diameter than the diameter of said water inlet passage; and means for separating said finely divided metal particles from the outlet water leaving the chamber through the outlet passage.

2. The apparatus of claim 1 wherein the finely divided metal having a suitable redox potential comprises copper and zinc.

3. The apparatus of claim 1 wherein the finely divided material comprises a weight ratio of copper:zinc between about 1:1 and about 7:3.

4. The apparatus of claim 1 wherein the water inlet passage directs the water against the inner wall of the chamber.

5. The apparatus of claim 4 wherein the water forms a spray upon contact with the inner wall of the chamber.

6. The apparatus of claim 1 wherein the water outlet passage connects to a showerhead.

7. The apparatus of claim 1 wherein the means for removing the finely divided metal from the outlet water is a screen having openings smaller than the diameter of the finely divided metal.

8. A shower system comprising in combination the water purification apparatus of claim 1 and a shower head, wherein water to be treated contacts said finely divided metal particles comprising copper and zinc under turbulent conditions and then said showerhead directly receives said water.

* * * * *